(12) United States Patent
Daly et al.

(10) Patent No.: US 8,788,757 B2
(45) Date of Patent: Jul. 22, 2014

(54) DYNAMIC INCLUSIVE POLICY IN A HYBRID CACHE HIERARCHY USING HIT RATE

(75) Inventors: David M. Daly, Croton-on-Hudson, NY (US); Benjiman L. Goodman, Cedar Park, TX (US); Stephen J. Powell, Austin, TX (US); Aaron C. Sawdey, Cannon Falls, MN (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/315,381

(22) Filed: Dec. 9, 2011

(65) Prior Publication Data
US 2013/0151777 A1    Jun. 13, 2013

(51) Int. Cl.
G06F 13/28    (2006.01)

(52) U.S. Cl.
USPC .......................................................... 711/122

(58) Field of Classification Search
None
See application file for complete search history.

(56) References Cited

U.S. PATENT DOCUMENTS

| | | | |
|---|---|---|---|
| 5,394,531 A * | 2/1995 | Smith | 711/136 |
| 5,564,035 A | 10/1996 | Lai | |
| 6,073,212 A | 6/2000 | Hayes et al. | |
| 6,321,297 B1 | 11/2001 | Shamanna et al. | |
| 6,370,622 B1 | 4/2002 | Chiou et al. | |
| 6,601,143 B1 * | 7/2003 | Lamparter | 711/134 |
| 7,143,240 B2 | 11/2006 | Hsu et al. | |
| 7,496,715 B1 | 2/2009 | Vartti et al. | |
| 7,502,892 B2 | 3/2009 | Hammarlund et al. | |
| 7,552,288 B2 | 6/2009 | Iyer et al. | |
| 7,565,493 B1 | 7/2009 | Todd et al. | |
| 7,802,057 B2 | 9/2010 | Iyer et al. | |
| 7,844,778 B2 | 11/2010 | Shen et al. | |
| 7,921,260 B2 | 4/2011 | Cain, III et al. | |
| 2003/0065886 A1 * | 4/2003 | Olarig et al. | 711/129 |
| 2005/0144317 A1 * | 6/2005 | Chase et al. | 709/238 |
| 2006/0106923 A1 | 5/2006 | Balasubramonian et al. | |
| 2008/0195849 A1 | 8/2008 | Gonzalez et al. | |
| 2008/0215816 A1 * | 9/2008 | Emma et al. | 711/122 |
| 2009/0037664 A1 | 2/2009 | Kornegay et al. | |

(Continued)

OTHER PUBLICATIONS

Performance Evaluation of Exclusive Cache Hierachies , Ying Zheng, IEEE 2004, pp. 89-96.*

(Continued)

*Primary Examiner* — Charles Rones
*Assistant Examiner* — Han Doan
(74) *Attorney, Agent, or Firm* — Francis Lammes; Stephen J. Walder, Jr.; Matthew B. Talpis

(57) ABSTRACT

A mechanism is provided for dynamic cache allocation using a cache hit rate. A first cache hit rate is monitored in a first subset utilizing a first allocation policy of N sets of a lower level cache. A second cache hit rate is also monitored in a second subset utilizing a second allocation policy different from the first allocation policy of the N sets of the lower level cache. A periodic comparison of the first cache hit rate to the second cache hit rate is made to identify a third allocation policy for a third subset of the N-sets of the lower level cache. The third allocation policy for the third subset is then periodically adjusted to at least one of the first allocation policy or the second allocation policy based on the comparison of the first cache hit rate to the second cache hit rate.

23 Claims, 8 Drawing Sheets

(56) References Cited

U.S. PATENT DOCUMENTS

| | | | |
|---|---|---|---|
| 2009/0172315 | A1 | 7/2009 | Iyer et al. |
| 2009/0271572 | A1 | 10/2009 | Hughes et al. |
| 2010/0122031 | A1* | 5/2010 | Strumpen et al. ............ 711/122 |
| 2010/0325367 | A1 | 12/2010 | Kornegay et al. |
| 2011/0016276 | A1 | 1/2011 | Wang |
| 2011/0113199 | A1* | 5/2011 | Tang et al. .................... 711/130 |
| 2011/0113200 | A1 | 5/2011 | Moses et al. |
| 2011/0145506 | A1 | 6/2011 | Cherukuri et al. |
| 2011/0153945 | A1 | 6/2011 | Kim et al. |
| 2011/0161589 | A1 | 6/2011 | Guthrie et al. |
| 2012/0311267 | A1 | 12/2012 | Gaither et al. |
| 2013/0036271 | A1* | 2/2013 | Krishna et al. ............... 711/135 |

OTHER PUBLICATIONS

Preliminary Amdendment filed on Sep. 12, 2012 for U.S. Appl. No. 13/315,411; 6 pages.

U.S. Appl. No. 13/611,614, 1 page.

U.S. Appl. No. 13/315,395, 1 page.

U.S. Appl. No. 13/315,411, 1 page.

Bobbala, Lakshmi D. et al., "Composite Pseudo-Associative Cache for Mobile Processors", 18th Annual IEEE/ACM International Symposium on Modeling, Analysis and Simulation of Computer and Telecommunication Systems, 2010, pp. 394-396.

Dybdahl, Haakon et al., "An LRU-based Replacement Algorithm Augmented with Frequency of Access in Shared Chip-Multiprocessor Cashes", ACM SIGARCH Computer Architecture News, vol. 35, No. 4, Sep. 2007, pp. 45-52.

Ferreira, Alexander P. et al., "Increasing PCM Man Memory Lifetime", Design, Automation & Test in Europe Conference & Exhibition, Mar. 8-12, 2010, 6 pages.

Gniady, Chris et al., "Program-Counter-Based Pattern Classification in Buffer Caching", USENIX Association, 6th Symposium on Operating Systems Design and Implementation, OSDI'04, vol. 6, 2004, 14 pages.

Hackenberg, Daniel et al., "Comparing Cache Architectures and Coherency Protocols on x86-64 Multicore SMP Systems", 42nd Annual IEEE/ACM International Symposium on Microarchitecture, MICRO'09, New York, New York, Dec. 12-16, 2009, pp. 413-422.

Jaleel, Aamer et al., "Achieving Non-Inclusive Cache Performance with Inclusive Caches: Temoral Locality Aware (TLA) Cache Management Policies", 43rd Annual IEEE/ACM International Symposium on Microarchitecture, 2010, pp. 151-162.

Kharbutli, Mazen et al., "Counter-Based Cache Replacement Algorithms", Proceedings of the International Conference on Computer Design, San Jose, California, Oct. 2-5, 2005, 9 pages.

Liu, Mengxiao et al., "Storage Architecture for an On-chip Multicore Processor", 12th Euromicro Conference on Digital System Design, Methods and Tools, 2009, pp. 263-270.

Megiddo, Nimrod et al., "ARC: A Self-Tuning, Low Overhead Replacement Cache", USENIX Association, Proceedings of FAST'03: 2nd USENIX Conference on File and Storage Technologies, San Francisco, California, Mar. 3-Apr. 2, 2003, pp. 115-130.

Meng, Jiayuan et al., "Avoiding Cache Thrashing due to Private Data Placement in Last-level Cache for Manycore Scaling", IEEE International Conference on Computer Design, ICCD 2009, pp. 282-288.

Ou, Li et al., "ASA: An Adaptive Space Allocation Algorithm for Cache Managment in Multi-level Cache Hierarchy", Proceedings of the 38th Southeastern Symposium on System Theory, Tennessee Technological University, Cookeville, Tennessee, Mar. 5-7, 2006, pp. 524-528.

Qureshi, Moinuddin K. et al., "Adaptive Insertion Policies for High Performance Caching", ISCA'07, San Diego, California, Jun. 9-13, 2007, 11 pages.

Subha, S., "A Two-Type Data Cache Model", IEEE International Conference on Electro/Information Technology, EIT'09, 2009, 476-481.

Subramanian, Ranjith et al., "Adaptive Caches: Effective Shaping of Cache Behavior to Workloads", MICRO-39, 2006, 14 pages.

Zhang, Xiushan, "L2 cache replacment based on inter-access time per access count prediction", Dissertation, State University of New York at Binghamtom, Abstract only, http://gradworks.umi.com/14/67/1467559.html, Dec. 2009, 1 page.

Office Action mailed May 7, 2013 for U.S. Appl. No. 13/315,395; 15 pages.

Response to Office Action dated Aug. 7, 2013, U.S. Appl. No. 13/315,395, 10 pages.

Notice of Allowance mailed Nov. 14, 2013 for U.S. Appl. No. 13/315,411; 16 pages.

Office Action dated Nov. 15, 2013 for U.S. Appl. No. 13/315,395; 11 pages.

* cited by examiner

DYNAMIC INCLUSIVE POLICY IN A HYBRID CACHE HIERARCHY USING HIT RATE

BACKGROUND

The present application relates generally to an improved data processing apparatus and method and more specifically to mechanisms for dynamic inclusive policy in a hybrid cache hierarchy using hit rate.

A central processing unit (CPU) cache is used to reduce memory latency. Modern processors use multiple levels of cache hierarchy, where higher level caches, such as level 1 (L1) cache, are closer to the processor core, while tower level caches, such as level 2 (L2), level 3 (L3), or the like, are further away from the processor core. In multi-level cache hierarchies, a cache may be classified as inclusive or exclusive, where inclusive means a cache comprises all data of any higher level cache in the cache hierarchy and exclusive means that data is only present in one cache of the cache hierarchy.

Given a fixed cache size for the higher and lower level caches, an exclusive multi-level cache hierarchy approach has a higher cache hit rate than an inclusive multi-level cache hierarchy approach due to the fact that the total cache capacity between the cache levels is greater in the exclusive approach than the inclusive approach. if both hierarchies are the same size, the exclusive approach has twice the capacity of the inclusive approach.

SUMMARY

In one illustrative embodiment, a method, in a data processing system, is provided for dynamic cache allocation using a cache hit rate. The illustrative embodiment monitors a first cache hit rate in a first subset of N sets of a lower level cache. In the illustrative embodiment, the first subset is utilizing a first allocation policy. The illustrative embodiment monitors a second cache hit rate in a second subset of the N sets of the lower level cache. In the illustrative embodiment, the second subset is utilizing a second allocation policy different from the first allocation policy. The illustrative embodiment periodically compares the first cache hit rate to the second cache hit rate to identify a third allocation policy for a third subset of the N-sets of the tower level cache. In the illustrative embodiment, the third allocation policy is at least one of the first allocation policy or the second allocation policy. The illustrative embodiment periodically adjusts the third allocation policy for the third subset of the N-sets of the lower level cache based on the comparison of the first cache hit rate to the second cache hit rate.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
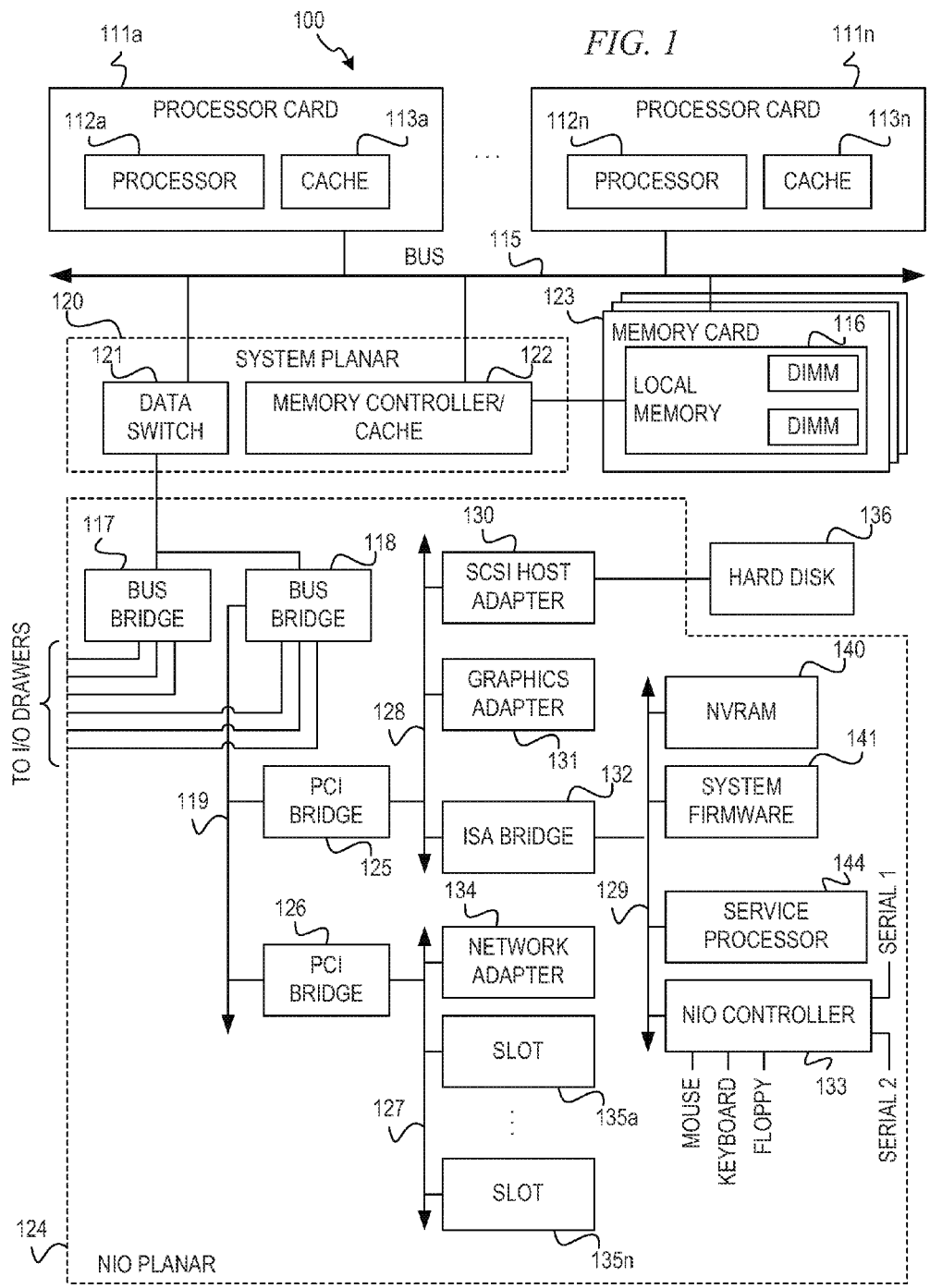
FIG. 1 depicts a block diagram of a data processing system with which aspects of the illustrative embodiments may advantageously be utilized.

In one embodiment, a mechanism is provided for dynamic inclusive policy in a hybrid cache hierarchy using hit rate. Cache misses in a higher level cache cause evictions from the higher level cache. The evictions may be modified evictions or unmodified evictions. In accordance with the illustrative embodiment, modified data is always sent to the lower level cache, while unmodified data may or may not be sent to the lower level cache. The hierarchy is pseudo-inclusive of unmodified data because the lower level cache may be set to allocate or not to allocate unmodified data that is due to a read miss data when forwarding read miss data up to the higher level cache as well as unmodified evictions from the higher level cache. Thus, in this illustrative embodiment, a dynamic mechanism detects a preferred allocation policy for handling unmodified data based on the current workload's cache hit recent history. Using two small groups of cache sets, the dynamic mechanism determines whether the lower level hybrid cache should operate inclusive of unmodified data or exclusive of unmodified data based on which group has a higher cache hit rate.

While current preferences are to have the highest hit rate between the cache hierarchies, which would be benefited by having all caches be exclusive, limitations exist with regard to, for example, bandwidth between the cache hierarchies, especially with regard to caches communicating across buses. Therefore, in another illustrative embodiment, a mechanism is provided for dynamic inclusive policy in a hybrid cache hierarchy using bandwidth. In this illustrative embodiment, a dynamic mechanism detects a preferred allocation policy for handling unmodified data based on current bandwidth utilization between the cache hierarchies. When bandwidth usage between cache hierarchies is low, the lower level cache is set to operate as exclusive where the higher level cache evicts both modified and unmodified data to the lower level cache and the lower level cache only allocates the evicted data from the higher level cache, thereby acting as a victim cache. When the bandwidth usage between cache hierarchies is high, the higher level cache only evicts modified data to the lower level cache and discards unmodified data. The lower level cache allocates the higher level modified evictions and also allocates read misses, for example, unmodified data missed in both higher and lower level cache and is retrieved from main memory. While read miss allocations are not ideal, as the decision to allocate is done at read time, such read miss allocations may improve the hit rate of the tower level cache when bandwidth is constrained.

As stated previously, a victim cache is a cache that only allocates blocks evicted from higher level caches. In order to make room for a new entry on a cache miss, a cache has to evict one of the existing entries. The heuristic that the cache uses to choose the entry to evict is called a replacement policy. The fundamental issue with any replacement policy is that the replacement policy must predict which existing cache entry is least likely to be used in the future. Various hardware algorithms, such as a Least-Recently-Used (LRU) algorithm, are used to determine which member should be victimized when allocating new entries to the cache associativity set. A cache victimization algorithm may impact performance by creating a higher cache miss rate if the victim is not carefully selected amongst the M members to be the one least likely to be referenced in the future. Thus, in still another illustrative embodiment, a weighted history allocation prediction mechanism is provided that initially classifies cache read miss allocations differently than cache write miss allocations, based on the operation type that originally missed in the cache. By using a weighted history allocation predictor algorithm, the dynamic mechanism increases the cache hit rate of the hybrid cache by using a unique victim selection algorithm that is based on the type of operation that was originally allocated to the cache (read miss versus write miss) as well as how often the member was referenced after initial allocation.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

Referring now to the drawings and in particular to FIG. 1, there is depicted a block diagram of a data processing system with which aspects of the illustrative embodiments may advantageously be utilized. As shown, data processing system 100 includes processor cards 111a-111n. Each of processor cards 111a-111n includes a processor unit and a cache memory. For example, processor card 111a contains processor unit 112a and cache memory 113a, and processor card 111n contains processor unit 112n and cache memory 113n. Processor units 112a and 112n may be a set of one or more processors or may be a multi-processor core, depending on the particular implementation. Additionally, cache memory 113a and 113n may be a set of one or more caches in a hierarchy, such that a higher level cache is closest to the processing unit and a tower level cache is closest to a memory.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119, PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
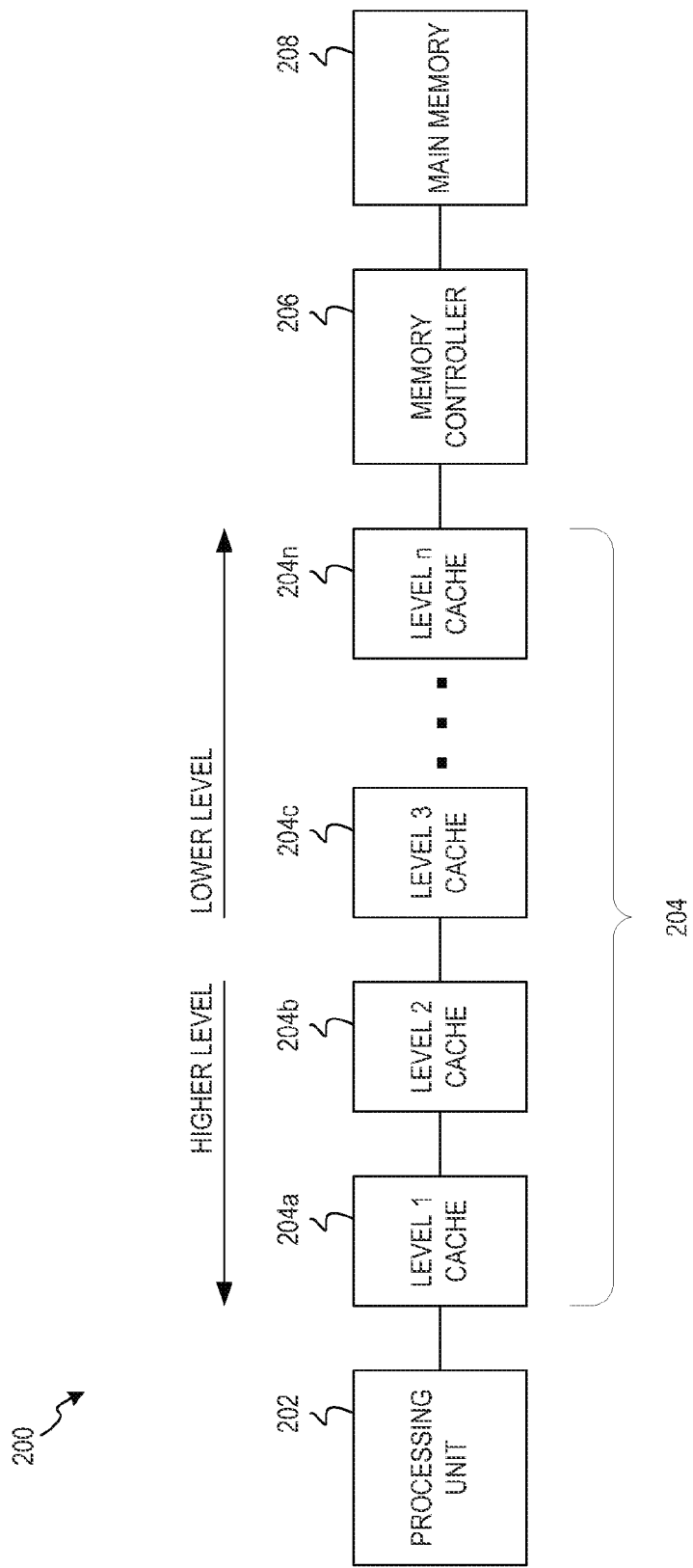
FIG. 2 depicts an exemplary cache hierarchy in accordance with an illustrative embodiment.

As stated previously, cache memory may be a set of one or more caches in a hierarchy, such that a higher level cache is closest to the processing unit and a lower level cache is closest to a memory. FIG. 2 depicts an exemplary cache hierarchy in accordance with an illustrative embodiment, Data processing system 200 comprises processing unit 202, plurality of caches 204, memory controller 206, and main memory 208. Plurality of caches 204 may be caches that form cache memory, such as cache memory 113a or 113n of FIG. 1. When processing unit 202 sends an access request for data, processing unit 202 sends the request to a highest level cache or level 1 (L1) cache 204a. If the data is present in L1 cache 204a, then processor 202 retrieves the data from L1 cache 204a. If the data is not present in L1 cache 204a, then processor 202 sends the request to a next highest level cache or level 2 (L2) cache 204b. If the data is present in L2 cache 204b, then processor 202 retrieves the data from L2 cache 204b. If the data is not present in the L2 cache 204a, then processor 202 continues to access each level of cache 204c through 204n in order to retrieve the data until processor 202 reaches the lowest level cache (Ln) 204n. If the data is not present in the Ln cache 204n, processor 202 sends the request to memory controller 206 in order to retrieve the data from main memory 208. Once the data is retrieved, from either a lower level cache or from main memory, the data is allocated to L1 cache 204a.

An important factor in determining the effectiveness of a cache relates to how the cache is mapped to the system memory. That is, there are many different ways to allocate the storage in a cache to the memory addresses the cache serves. Generally, there are three different ways that this mapping is performed: direct mapped cache, fully associative cache, and N-way set associative cache. In a direct mapped cache, a determination is made of how many cache lines exist. Once the number of cache lines is determined, then the system memory is divided into the same number of chunks. Then the cache operates such that each chunk of system memory uses only one cache line. In a fully associative cache, instead of hard-allocating cache lines to particular memory locations, the cache operates so that any line may store the contents of any memory location. In an N-way set associative cache, the cache is broken into sets where each set contains "N" cache lines. Then, each memory address is assigned a set, and can be cached in any one of those "N" cache lines within the set that it is assigned to. This design means that there are "N" possible places that a given memory location may be in the cache. The tradeoff is that there are "N" times as many memory locations competing for the same "N" lines in the set. Conceptually, the direct mapped and fully associative caches are just "special cases" of the N-way set associative cache.

Lower level caches 204b, 204c, . . . , 204n may operate either inclusively or exclusively. In an inclusive operation, all data in a higher level cache must also be somewhere in the adjacent tower level cache. For example, all data in L1 cache 204a must also be in L2 cache 204b and all data in L2 cache 204b must also be in L3 cache 204c, and so on. If all caches in the plurality of caches 204 are to operate inclusively, then each lower level cache has to be at least twice the size of the adjacent higher level cache so that the lower level cache may store the data of the higher level cache as well as the data for that cache's level.

In an exclusive operation, data is guaranteed to be in at most one of the plurality of caches 204 but never in both. If all caches in the plurality of caches 204 are to operate exclusively, then each cache may be of any size. The advantage of exclusive caches is that such caches store more data. This advantage is larger when the exclusive L1 cache is comparable to the L2 cache, and diminishes if the L2 cache is many times larger than the L1 cache. When the L1 misses and the L2 hits on an access, the hitting cache line in the L2 is exchanged with a line in the L1. This exchange is quite a bit more work than just copying a line from L2 to L1, which is what occurs in an inclusive cache.

Further, processor 202 may read data in L1 cache 204a thereby leaving the data unmodified or may be write to data in L1 cache 204a thereby making the data modified. L1 cache 204 is full and new data is to be read into L1 cache 204a, the L1 cache 204a has to evict other data, either modified or unmodified, in order to make room for the new data. If the lower level caches are operating inclusively, then the lower level cache may either evict the same data to store the new data or evict data from its own level so that both the old data and new data from the higher level cache are stored.

As the inventors herein have recognized, certain workloads may see improved cache hit rates, and therefore better performance, by always allocating the unmodified data into a lower level cache, while other workloads will benefit from a policy of never allocating unmodified data to the lower level cache. This performance difference is because the decision to allocate unmodified data in the lower level cache may impact the amount of cache capacity in the lower level, which may impact the hit rate and, thus, the performance of the workload due to the average latency of higher level cache misses.

Figure 3:
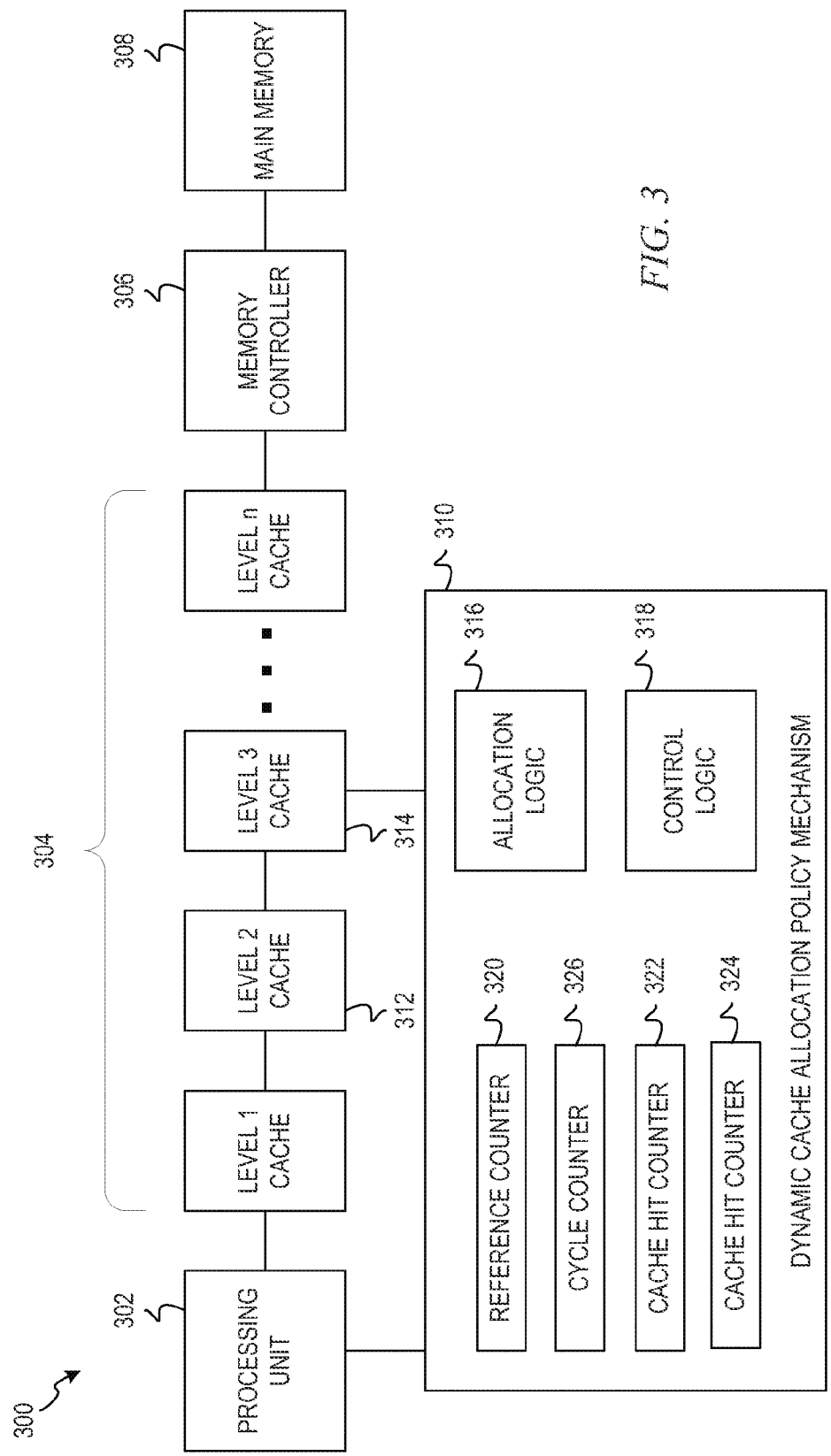
FIG. 3 depicts an exemplary dynamic cache allocation policy mechanism in accordance with an illustrative embodiment.

Thus, in one embodiment, a dynamic cache allocation policy mechanism is provided to detect which allocation policy would work best for unmodified data based on the current workload's cache hit recent history. FIG. 3 depicts an exemplary dynamic cache allocation policy mechanism in accordance with an illustrative embodiment. Data processing system 300 comprises processing unit 302, plurality of caches 304, memory controller 306, and main memory 308 as well as dynamic cache allocation policy mechanism 310. Data processing system 300 operates similar to the operation performed in data processing system 200 of FIG. 2 except that, in order to dynamically determine whether unmodified data should be allocated to a lower level cache in a multi-cache hybrid hierarchy, such as that formed by plurality of caches 304, dynamic cache allocation policy mechanism 310 uses cache hit rates of both inclusive and exclusive allocation policies in two sample sets within a lower level cache adjacent to a higher level cache to determine a global policy for the remainder of the lower level cache.

For each set of adjacent higher level cache and lower level cache, for example, higher level cache 312 and lower level cache 314, in lower level cache 314 of N sets, allocation logic 316 in dynamic cache allocation policy mechanism 310 groups a first subset of the N sets in lower level cache 314 as a first group, groups a second subset of the N sets in tower level cache 314 as a second group, and groups the remaining sets as a third subset of the N sets in the lower level cache as a third group. Allocation logic 316 then reserves either group 1 or group 2 for always allocating cache read misses and reserves the other of group 1 or group 2 for never allocating cache read misses. As an example, allocation logic 316 reserves group 1 for always allocating cache read misses and reserves group 2 for never allocating cache read misses.

During cache references from processor 302 to tower level cache 314, control logic 318 monitors each cache reference and increments reference counter 320 for each cache reference up to a predetermined maximum K cache references, such as 10,000 cache references. Also during the time between the first cache reference up to the K cache references, control logic 318 increments counter 322 each time a cache hit occurs to data in group 1 and increments counter 324 each time a cache hit occurs to data in group 2.

When reference counter 320 reaches the predetermined maximum K cache references, control logic 318 compares the counter value of counter 322 to the counter value of counter 324 to determine whether group 1 has a better hit rate or group 2 has a better hit rate. Based on the present example of allocation logic 316 reserved group 1 for always allocating cache read misses and reserved group 2 for never allocating cache read misses, if counter 322 has a better hit rate, then control logic 318 would instruct allocation logic 316 to set the N sets in group 3 to always allocate cache read misses, allocating modified data and unmodified data from higher level cache 312. However, if counter 324 has a better hit rate, then control logic 318 would instruct allocation logic 316 to set the N sets in group 3 to never allocate cache read misses, i.e. allocating modified data but not unmodified data from higher level cache 312. Thus, with the changes in allocation policy for lower level cache 314, lower level cache 314 operates exclusively for modified data and pseudo-inclusively for unmodified data based on the comparison between the counter values of counter 322 and counter 324. Once allocation logic 316 sets the N sets in group 3 to always allocate cache read misses or never allocate cache read misses based on the comparison, control logic 318 resets reference counter 320, counter 322, and counter 324 to zero, with the process starting over afterwards.

In order to ensure that the counter values are indicative of the actual hit rates to the respective groups, control logic 318 may normalize the hit rates of group 1 and group 2 by instruction allocation logic 316 to select the subset of the N sets in lower level cache 314 such that group 1 subset is substantially equal to the group 2 subset. However, if it is not possible to create two groups that are substantially equal, then control logic 318 may normalize the hit rates of group 1 and group 2 by dividing each counter value by the number of N sets in the associated group.

Further to this embodiment, reference counter 320 may be replaced with a cycle counter 326 that counts compute cycles rather than cache references. The operation would work the same, when a predetermined maximum cycle count C is reached, such that when the cycle counter 326 reaches the predetermined maximum cycle count value, control logic 318 compares the counter value of counter 322 to the counter value of counter 324 to determine whether group 1 has a better hit rate or group 2 has a better hit rate and instructs allocation logic 316 to set the N sets in group 3 to either always allocate cache read misses or never allocate cache read misses based on the comparison. In the event that the group 1 counter and the group 2 counter are equal, allocation logic 316 would leave the setting of the N sets as they are currently operating.

From that point, control logic 318 would reset the cycle counter, counter 322, and counter 324 to zero, with the process starting over afterwards.

Still further to this embodiment, control logic 318 may also implement a "decaying count" preference, such that every K references or N cycles (whichever is implemented), control logic 318 divides the count values in counters 322 and 324 by a predetermined divisor value X in order to make past hit rates less important than the current hit rates.

Figure 4:
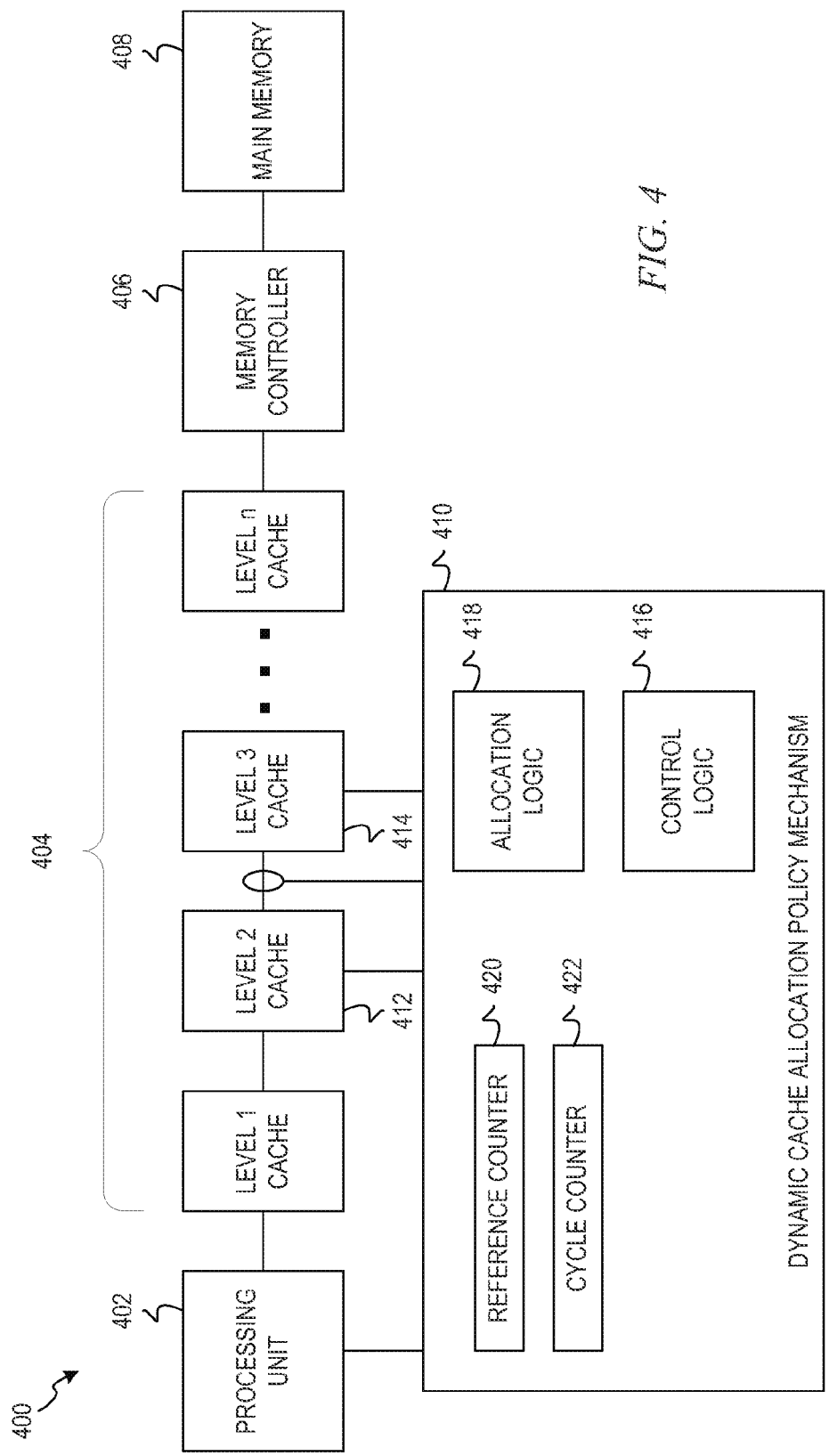
FIG. 4 depicts an exemplary dynamic cache allocation policy mechanism in accordance with an illustrative embodiment.

As the inventors herein have further recognized, a preferred operating environment would be one where there is a highest hit rate between the caches in he cache hierarchy. However, having a highest hit rate may not be possible due to bandwidth between caches, especially if the caches must communicate across a bus. Therefore, in another embodiment, a dynamic cache allocation policy mechanism is provided to detect which allocation policy would work best for unmodified data based on the current bandwidth utilization between caches. FIG. 4 depicts an exemplary dynamic cache allocation policy mechanism in accordance with an illustrative embodiment. Data processing system 400 comprises processing unit 402, plurality of caches 404, memory controller 406, and main memory 408 as well as dynamic cache allocation policy mechanism 410. Data processing system 400 operates similar to the operation performed in data processing system 200 of FIG. 2 except that, in order to dynamically determine whether unmodified data should be allocated to a lower level cache in a multi-cache hybrid hierarchy, such as that formed by plurality of caches 404, dynamic cache allocation policy mechanism 410 monitors the bandwidth between adjacent caches and dynamically adjusts the lower level cache to operate exclusively if the bandwidth is low and pseudo-inclusive (Hybrid) when bandwidth is high.

For each set of adjacent higher level cache and lower level cache, for example, higher level cache 412 and lower level cache 414, control logic 416 monitors the bandwidth between higher level cache 412 and lower level cache 414. When control logic 416 identifies that bandwidth between higher level cache 412 and lower level cache 414 is less congested or high such that the bandwidth usage is below a first predetermined threshold, control logic 416 instructs allocation logic 418 to set higher level cache 412 and lower level cache 414 to operate exclusively. That is, when bandwidth usage between higher level cache 412 and lower level cache 414 is low, higher level cache 412 and lower level cache 414 are set to behave as inclusive where higher level cache 412 evicts both modified and unmodified data to lower level cache 414 and lower level cache 414 only allocates evicted data from higher level cache 414, which allows the allocation to be most recently used (MRU) after a recent eviction from higher level cache 412.

When control logic 416 identifies that bandwidth between higher level cache 412 and lower level cache 414 is congested or low such that the bandwidth usage is above a second predetermined threshold, control logic 416 instructs allocation logic 418 to set higher level cache 412 to evict modified data to lower level cache 414 and discards unmodified data evictions without writing to a lower level cache. When bandwidth is congested or low, control logic 416 also instructs allocation logic 418 to set lower level cache 414 to only allocate modified evictions from high level cache 412 and allocate read misses retrieved from main 408, such as unmodified data that missed in both higher level cache 412 and lower level cache 414. While read miss allocations are not ideal as the decision to allocate is done at read time, allocation logic 418 setting lower level cache 414 to allocated read misses may improve the hit rate of lower level cache 414 when bandwidth is constrained. Between the first predetermined threshold and the second predetermined threshold, control logic 416 and allocation logic 418 leave the cache settings as they are currently set.

In order to avoid thrashing, control logic 416 may utilize reference counter 420 or cycle counter 422, such that adjustments made to the settings of higher level cache 412 and lower level cache 414 are only performed when the value of reference counter 420 reaches a predetermined number K of cache reference or when the value of cycle counter 422 reaches a predetermined number C of cycles.

Figure 5:
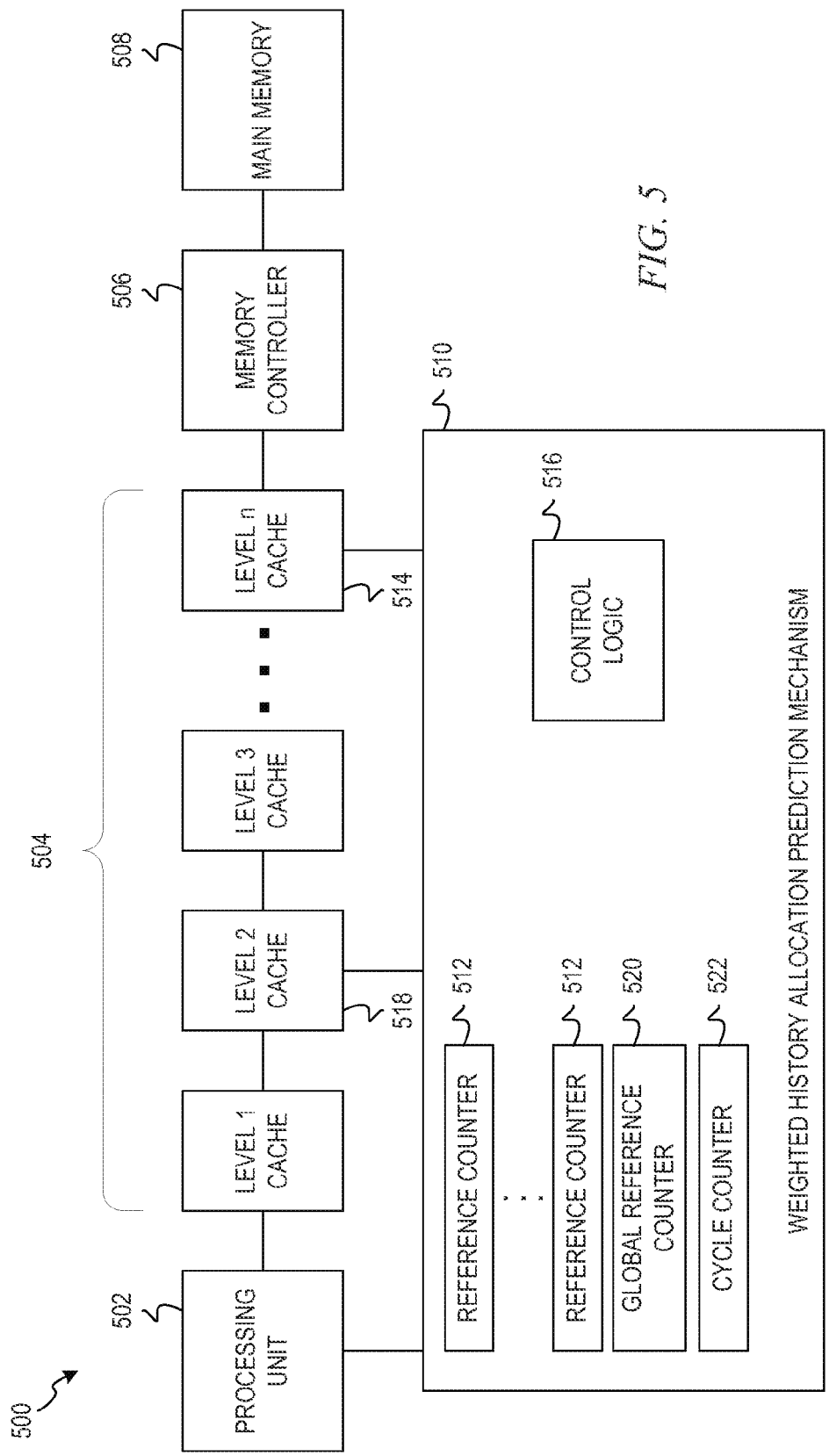
FIG. 5 depicts an exemplary dynamic cache allocation policy mechanism in accordance with an illustrative embodiment.

As the inventors have still further herein recognized, in order to make room for a new entry in a cache on a cache miss, the cache has to evict one of the existing entries. The heuristic that a cache uses to choose the entry to evict is called a replacement policy and the fundamental issue with any replacement policy is that the replacement policy used by the cache must predict which existing cache entry is least likely to be used in the future. A cache victimization algorithm may have a direct impact on performance by creating a higher cache miss rate if the victim is not carefully selected amongst the cache members M of the N sets in the cache to be the one least likely to be referenced in the future. Hence, in yet another embodiment, a weighted history allocation prediction mechanism is provided that initially classifies cache read miss allocations differently than cache write miss allocations, based on the operation type that originally missed the in the cache. FIG. 5 depicts an exemplary dynamic cache allocation policy mechanism in accordance with an illustrative embodiment. Data processing system 500 comprises processing unit 502, plurality of caches 504, memory controller 506, and main memory 508 as well as weighted history allocation prediction mechanism 510. Data processing system 500 operates similar to the operation performed in data processing system 200 of FIG. 2 except that, in order to increase the cache hit rate in a lower level cache, weighted history allocation prediction mechanism 510 uses a unique victim selection that is based on the type of operation that was originally allocated to the cache as well as how often the member was referenced after initial allocation.

Weighted history allocation prediction mechanism 510 comprises a plurality of reference counters 512, one for each cache member M in each set N of a lower level cache, such as lower level cache 514 in the plurality of caches 504, Each reference counter 512 counts a number of references to that member from the time the member was initially allocated to lower level cache 514, where the value of the reference counter 512 is used to select a victim for eviction when needed. When a cache member is initially allocated, control logic 516 initializes its associated reference counter 512 with a reference count based on the operation type. Operation types may be differentiated between, for example:
- higher level cache reads from higher level cache 518 versus higher level victimizations from higher level cache 518;
- write miss operations to lower level cache 514 versus read miss operations to lower level cache 514 in order to allow the writes to exist in the lower level cache 514 longer than the reads, since write bandwidth is often time less than the read bandwidth;
- demand reads versus prefetch reads;
- cache miss operations based on whether the read is for demand reads versus direct memory access (DMA) reads;
- write operations based on higher level cache victimizations versus DMA writes;
- or the like.

Once each reference counter associated with each member in the N sets of lower level cache 514 is initialized with its initial value, control logic 516 increments a respective reference counter 512 each time its associated member is referenced by processor 502. Thus, members that are referenced more often will have a higher counter value in their associated reference counter 512 and are more likely to remain resident in lower level cache 514 longer, thereby improving a cache hit rate of lower level cache 514, When an eviction is made from a higher level cache, control logic 516 chooses a victim amongst the member or members that have a lowest reference count in reference counter 512. If there is more than one reference counter 512 that has a lowest reference count value, then control logic 516 may randomly choose or otherwise identify one of the members associated with the reference counters 512 having the lowest reference count values.

Additionally, in order to ensure that there is always at least one lowest reference count within reference counters 512, control logic 516 may periodically or at predefined times reduce all reference counters 512 by a value of 1. Further, control logic may utilize global reference counter 520 or cycle counter 522, such that reference counters 512 are reduced by a value of 1 when the value of global reference counter 520 reaches a predetermined number K of cache references to lower level cache 514 or when the value of cycle counter 522 reaches a predetermined number C of cycles.

Further to this embodiment, when a cache miss occurs and a data needs to be read into the cache from main memory 508 via memory controller 506, once a victim is selected by control logic 516 and evicted by lower level cache 514, control logic 516 resets the reference counter 512 associated with the zero and then increments the reference counter to an initial value based on the memory command type, as described previously. That is, at cache allocation time, control logic 516 uses the command type to select which allocation reference count should be used to initialize the associated reference counter 512.

As wilt be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area. network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
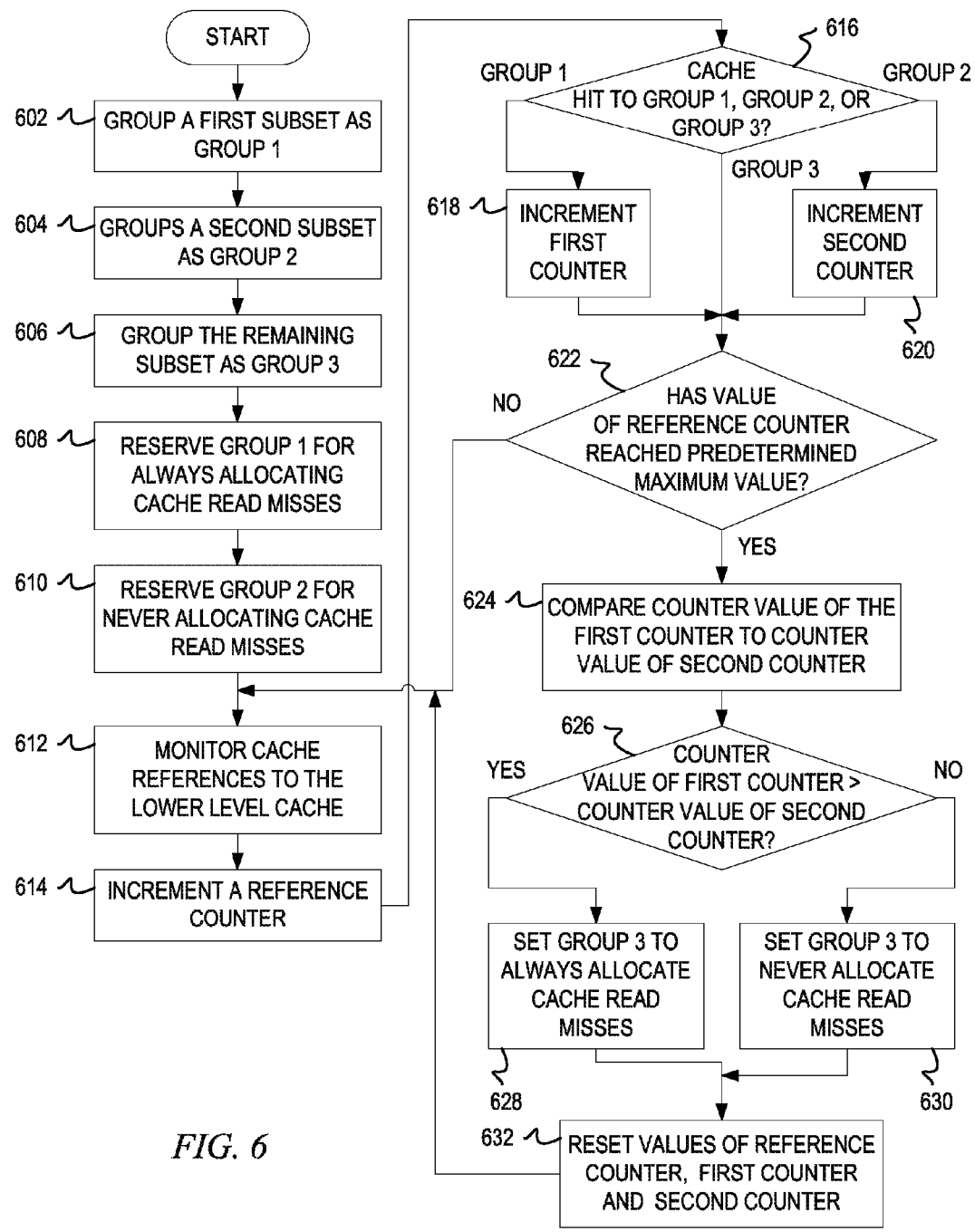
FIG. 6 depicts a flow diagram of an exemplary operation of a dynamic cache allocation policy mechanism using a cache hit rate in accordance with an illustrative embodiment.

FIG. 6 depicts a flow diagram of an exemplary operation of a dynamic cache allocation policy mechanism using a cache hit rate in accordance with an illustrative embodiment. As the operation begins, for an adjacent set of higher level cache and lower level cache, allocation logic in the dynamic cache allocation policy mechanism groups a first subset of the N sets in the lower level cache as a first group (group 1) (step 602), groups a second subset of the N sets in the lower level cache as a second group (group 2) (step 604), and groups the remaining subset of the N sets in the lower level cache as a third subset or third group (group 3) (step 606). The allocation logic then reserves, for example, the first subset or group 1 for always allocating cache read misses (step 608) and reserves the second subset or group 2 for never allocating cache read misses (step 610).

During cache references from a processor to the lower level cache, control logic in the dynamic cache allocation policy mechanism monitors the cache references to the lower level cache (step 612). For each cache reference, the control logic increments a reference counter (step 614). The control logic then determines whether a cache reference is a cache hit to the group 1, group 2, or a third subset or group 3 (step 616). If at step 616 there is a cache hit to data in the first subset or group 1, then control logic increments a first counter (step 618). If at step 616 there is a cache hit to data in the second subset or group 2, then control logic increments a second counter (step 620). From steps 618 and 620 or if at step 616 there is a cache hit to data in the third subset or group 3, the control logic determines whether the value of the reference counter has reached a predetermined maximum K cache references (step 622).

If at step 622 the value of the reference counter has not reached the predetermined maximum K cache references, then the operation returns to step 612. If at step 622 the value of the reference counter has reached the predetermined maximum K cache references, the control logic compares the counter value of the first counter to the counter value of second counter (step 624). As is noted above with regard to FIG. 3, the reference counter may be replaced by a cycle counter. The control logic uses the comparison of the counter value of the first counter to the counter value of second counter to determine whether group 1 has a better hit rate or group 2 has a better hit rate (step 626). If at step 626 the first counter is greater than the second counter, then the control logic sets the N sets in group 3 to always allocate cache read misses (step 628). If at step 626 the second counter is greater than the first counter, then the control logic sets the N sets in group 3 to never allocate cache read misses (step 630). From steps 628 and 630, the control logic resets the values of the reference counter, the first counter and the second counter to zero (step 632), with the operation returning to step 612 thereafter.

Thus, with the changes in allocation policy for the lower level cache, the lower level cache operates exclusively for modified data and pseudo-inclusively for unmodified data based on the comparison between the counter values of the first counter, and the second counter. Therefore, the operation of the dynamic cache allocation policy mechanism of FIG. 6 provides detection which allocation policy would work best for unmodified data based on the current workload's cache hit recent history.

Figure 7:
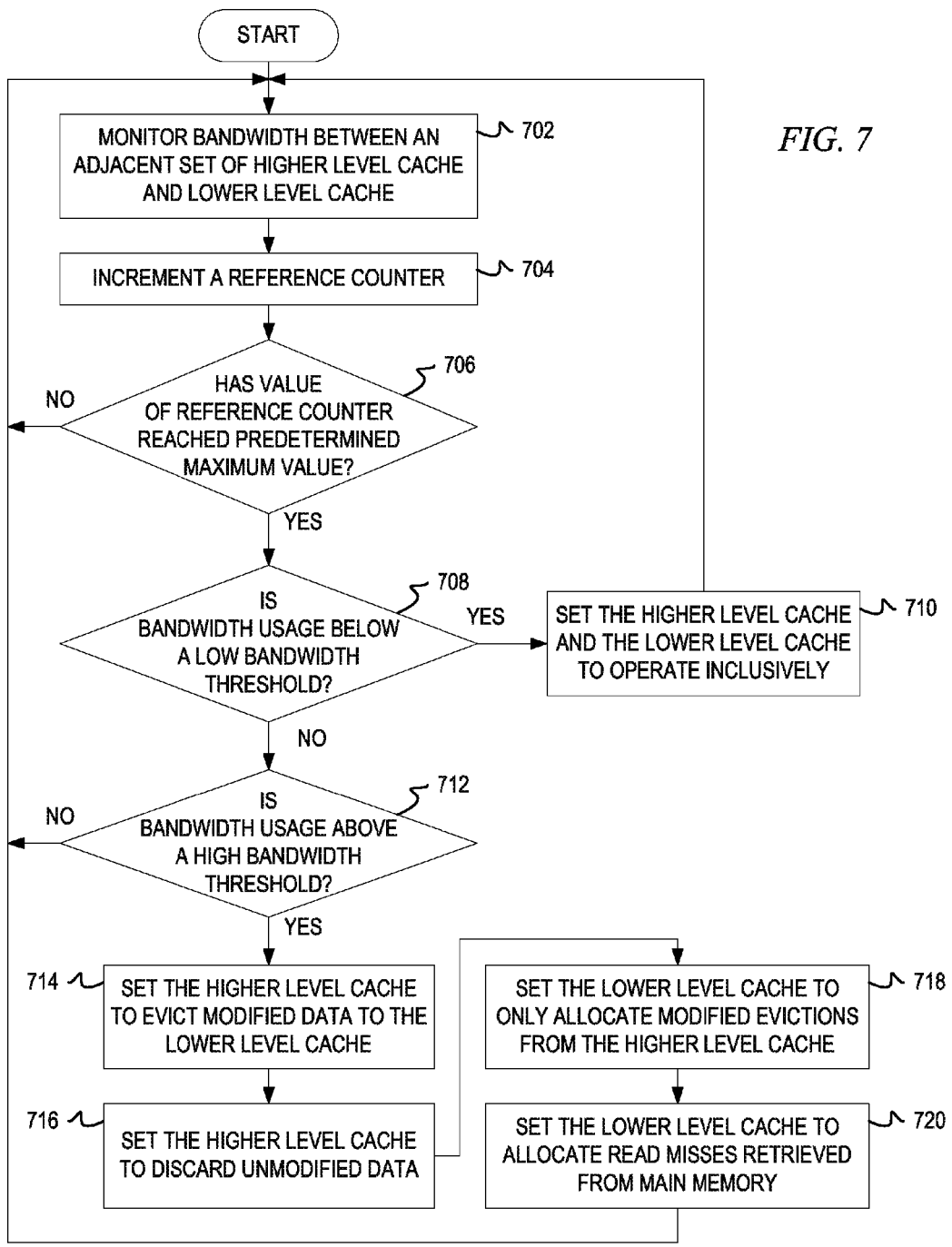
FIG. 7 depicts a flow diagram of an exemplary operation of a dynamic cache allocation policy mechanism using bandwidth in accordance with an illustrative embodiment.

FIG. 7 depicts a flow diagram of an exemplary operation of a dynamic cache allocation policy mechanism using bandwidth in accordance with an illustrative embodiment. As the operation begins, during cache references from a processor to the lower level cache, control logic in the dynamic cache allocation policy mechanism monitors a bandwidth between an adjacent set of higher level cache and lower level cache (step 702). For each cache reference, the control logic increments a reference counter (step 704). The control logic then determines whether the value of the reference counter has reached a predetermined maximum K cache references (step 706). If at step 706 the value of the reference counter has not reached the predetermined maximum K cache references, then the operation returns to step 702. If at step 706 the value of the reference counter has reached the predetermined maximum K cache references, the control logic determines whether the bandwidth usage is below a predetermined low bandwidth threshold (step 708). As is noted above with regard to FIG. 4, the reference counter may be replaced by a cycle counter. If at step 708 the bandwidth usage is below the predetermined low bandwidth threshold, then allocation logic in the dynamic cache allocation policy mechanism sets the higher level cache and the lower level cache to operate inclusively (step 710), where the higher level cache evicts both modified and unmodified data to the lower level cache. Thus, the lower level cache only allocates evicted data from the higher level cache, which allows the allocation to be most recently used (MRU) after a recent eviction from the higher level cache. From step 710, the operation returns to step 702.

If at step 708 the bandwidth usage is above the predetermined low bandwidth threshold, the control logic determines whether the bandwidth usage is above a predetermined high bandwidth threshold (step 712). If at step 712 the bandwidth usage is above the predetermined high bandwidth threshold, the allocation logic sets the higher level cache to evict modified data to the lower level cache (step 714) and sets the higher level cache to discard unmodified data evictions without writing to a lower level cache (step 716). Also, if at step 712 the bandwidth usage is above the predetermined high bandwidth threshold, the allocation logic sets the lower level cache to only allocate modified evictions from the higher level cache (step 718) and sets the lower level cache to allocate read misses retrieved from main memory (step 720). From step 720 or if at step 712 the bandwidth usage is not above the predetermined high bandwidth threshold, the operation returns to step 702.

Thus, with the changes in allocation policy, the tower level cache operates exclusively if the bandwidth is low and pseudo-inclusive (Hybrid) when bandwidth is high. Therefore, the operation of the dynamic cache allocation policy mechanism of FIG. 6 provides detection which allocation policy would work best for unmodified data based on the current bandwidth utilization between caches.

Figure 8:
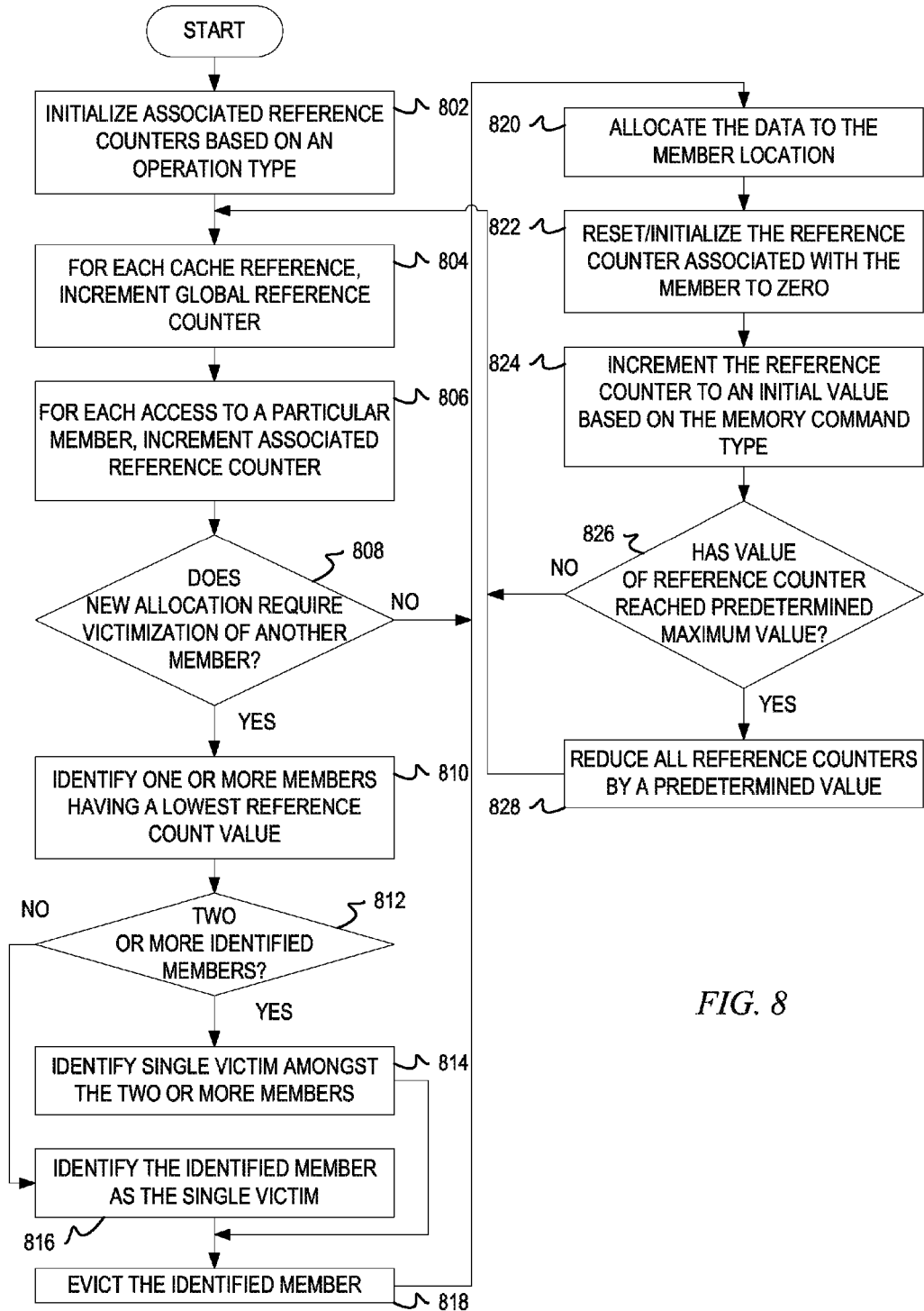
FIG. 8 depicts a flow diagram of an exemplary operation of a weighted history allocation prediction mechanism in accordance with an illustrative embodiment.

FIG. 8 depicts a flow diagram of an exemplary operation of a weighted history allocation prediction mechanism in accordance with an illustrative embodiment. As the operation begins, for each member in a lower level cache, control logic in the weighted history allocation prediction mechanism initializes an associated reference counter in the weighted history allocation prediction mechanism based on an operation type that caused the data to be allocated to the lower level cache (step 802). Then, during cache references from a processor to the lower level cache, for each cache reference, the control logic increments a global reference counter (step 804). For each access to a particular member in the lower level cache, the control logic increments the reference counter associated with the member (step 806). The control logic then determines whether a new allocation of data to the lower level cache requires victimization of another member already in the lower level cache (step 808).

If at step 808 the new allocation of data requires victimization of another member in the lower level cache, the control logic identifies one or more members of the lower level cache that have a lowest reference count value in the one or more associated reference counters (step 810). The control logic determines whether there are two or more identified members (step 812). If at step 812 there are two or more members, then the control logic identifies a single victim amongst the two or more members based on a predefined identification method, such as a random choice, a first member based on address, or the like (step 814). If at step 812 there are not two or more members, then the control logic identifies the identified member as the single victim (step 816).

From step 814 or 816, the lower level cache evicts the identified member (step 818). From step 818 or if at step 808 the new allocation of data does not require victimization of another member in the lower level cache, the lower level cache allocates the data to the member location (step 820), the control logic then resets/initializes the reference counter associated with the member to zero (step 822), and the control logic increments the reference counter to an initial value based on the memory command type (step 824).

The control logic then determines whether the value of the global reference counter has reached a predetermined maximum K cache references (step 826). If at step 826 the value of the global reference counter has not reached the predetermined maximum K cache references, then the operation returns to step 804. If at step 826 the value of the global reference counter has reached the predetermined maximum K cache references, the control logic reduces all reference counters by a predetermined value (step 828), with the operation returning to step 804 thereafter, As is noted above with regard to FIG. 6, the global reference counter may be replaced by a cycle counter.

Thus, the weighted history allocation prediction mechanism classifies cache allocations differently based on the operation type that originally placed the data in the cache. Therefore, the weighted history allocation prediction mechanism increases the cache hit rate of the lower level cache by using a unique victim selection mechanism that is based on the type of operation that originally allocated the data to the cache as well as how often the member was referenced after initial allocation.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters. Additionally, the various counters my be implemented as a saturation counter.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamic cache allocation using a cache hit rate, the method comprising:
    monitoring a first cache hit rate in a first subset of N sets of a lower level cache, wherein the first subset is utilizing a first allocation policy;
    monitoring a second cache hit rate in a second subset of the N sets of the lower level cache, wherein the second subset is utilizing a second allocation policy different from the first allocation policy;
    periodically comparing the first cache hit rate to the second cache hit rate to identify a third allocation policy for a third subset of the N-sets of the lower level cache, wherein the third allocation policy is at least one of the first allocation policy or the second allocation policy; and
    periodically adjusting the third allocation policy for the third subset of the N-sets of the lower level cache based on the comparison of the first cache hit rate to the second cache hit rate.

2. The method of claim 1, wherein, responsive to the first cache hit rate being greater than the second cache hit rate, the third allocation policy is adjusted to the first allocation policy.

3. The method of claim 1, wherein, responsive to the second cache hit rate being greater than the first cache hit rate, the third allocation policy is adjusted to the second allocation policy.

4. The method of claim 1, wherein the periodic comparison and the periodic adjustment is performed when a maximum number of references to the lower level cache have occurred.

5. The method of claim 1, wherein he periodic comparison and the periodic adjustment is performed when a maximum number of cycles have occurred.

6. The method of claim 1, wherein the first allocation policy is an inclusive policy where modified data and unmodified data are allocated to the lower level cache from an adjacent higher level cache.

7. The method of claim 1, wherein the second allocation policy is an exclusive policy where modified data is allocated to the lower level cache from an adjacent higher level cache but unmodified data is never allocated to the lower level cache from the adjacent higher level cache.

8. The method of claim 1, wherein the first cache hit rate and the second cache hit rate are periodically adjusted by dividing each of the first cache hit rate and the second cache hit rate by a predetermined value in order to weigh current hit rates higher than past hit rates.

9. The method of claim 1, wherein prior to periodically comparing the first cache hit rate to the second cache hit rate, the first cache hit rate is normalized based on a number of members in first subset and the second cache hit rate is normalized based on a number of members in second subset.

10. A computer program product comprising a non-transitory computer readable storage medium having a computer readable program stored therein, wherein the computer readable program, when executed on a computing device, causes the computing device to:
    monitor a first cache hit rate in a first subset of N sets of a lower level cache, wherein the first subset is utilizing a first allocation policy;
    monitor a second cache hit rate in a second subset of the N sets of the lower level cache, wherein the second subset is utilizing a second allocation policy different from the first allocation policy;
    periodically compare the first cache hit rate to the second cache hit rate to identify a third allocation policy for a third subset of the N-sets of the lower level cache, wherein the third allocation policy is at least one of the first allocation policy or the second allocation policy; and
    periodically adjust the third allocation policy for the third subset of the N-sets of the lower level cache based on the comparison of the first cache hit rate to the second cache hit rate.

11. The computer program product of claim 10, wherein, responsive to the first cache hit rate being greater than the second cache hit rate, the third allocation policy is adjusted to the first allocation policy.

12. The computer program product of claim 10, wherein, responsive to the second cache hit rate being greater than the first cache hit rate, the third allocation policy is adjusted to the second allocation policy.

13. The computer program product of claim 10, wherein the periodic comparison and the periodic adjustment is performed when a maximum number of references to the lower level cache have occurred.

14. The computer program product of claim 10, wherein the, periodic comparison and the periodic adjustment is performed when a maximum number of cycles have occurred.

15. The computer program product of claim 10, wherein the first allocation policy is an inclusive policy where modified data and unmodified data are allocated to the lower level cache from an adjacent higher level cache.

16. The computer program product of claim 10, wherein the second allocation policy is an exclusive policy where modified data is allocated to the lower level cache from an adjacent higher level cache but unmodified data is never allocated to the lower level cache from the adjacent higher level cache.

17. An apparatus, comprising:

a processor; and a memory coupled to the processor, wherein the memory comprises instructions which, when executed by the processor, cause the processor to:

monitor a first cache hit rate in a first subset of N sets of a lower level cache, wherein the first subset is utilizing a first allocation policy;

monitor a second cache hit rate in a second subset of the N sets of the lower level cache, wherein the second subset is utilizing a second allocation policy different from the first allocation policy;

periodically compare the first cache hit rate to the second cache hit rate to identify a third allocation policy for a third subset of the N-sets of the lower level cache, wherein the third allocation policy is at least one of the first allocation policy or the second allocation policy; and periodically adjust the third allocation policy for the third subset of the N-sets of the lower level cache based on the comparison of the first cache hit rate to the second cache hit rate.

18. The apparatus of claim 17, wherein, responsive to the first cache hit rate being greater than the second cache hit rate, the third allocation policy is adjusted to the first allocation policy.

19. The apparatus of claim 17, wherein, responsive to the second cache hit rate being greater than the first cache hit rate, the third allocation policy is adjusted to the second allocation policy.

20. The apparatus of claim 17, wherein the periodic comparison and the periodic adjustment is performed when a maximum number of references to the lower level cache have occurred.

21. The apparatus of claim 17, wherein the periodic comparison and the periodic adjustment is performed when a maximum number of cycles have occurred.

22. The apparatus of claim 17, wherein the first allocation policy is an inclusive policy where modified data and unmodified data are allocated to the lower level cache from an adjacent higher level cache.

23. The apparatus of claim 17, wherein the second allocation policy is an exclusive policy where modified data is allocated to the lower level cache from an adjacent higher level cache but unmodified data is never allocated to the lower level cache from the adjacent higher level cache.

* * * * *